United States Patent [19]

Cook

[11] Patent Number: 4,993,818
[45] Date of Patent: Feb. 19, 1991

[54] CONTINUOUS ZOOM ALL-REFLECTIVE OPTICAL SYSTEM

[75] Inventor: Lacy G. Cook, El Segundo, Calif.

[73] Assignee: Hughes Aircraft Company, Los Angeles, Calif.

[21] Appl. No.: 259,013

[22] Filed: Oct. 17, 1988

[51] Int. Cl.[5] .................. G02B 17/06; G02B 23/06; G02B 7/18; G02B 15/00
[52] U.S. Cl. .................................. 350/505; 350/560; 350/620
[58] Field of Search ........... 350/505, 504, 503, 620 X, 350/619, 519, 560 X, 570, 442, 443, 429

[56] References Cited

U.S. PATENT DOCUMENTS 4,101,195 7/1978 Korsch .
4,812,030 3/1989 Pinson .............................. 350/620

Primary Examiner—Jon W. Henry
Attorney, Agent, or Firm—William J. Streeter; Wanda K. Denson-Low

[57] ABSTRACT

The present optical system provides an all-reflective continuous zoom optical system. An imaging mechanism including the tertiary mirror (14) of a three-mirror (10, 12, 14) anastigmat is moved to effect a change in the focal length, field of view, or both of the system.

19 Claims, 3 Drawing Sheets

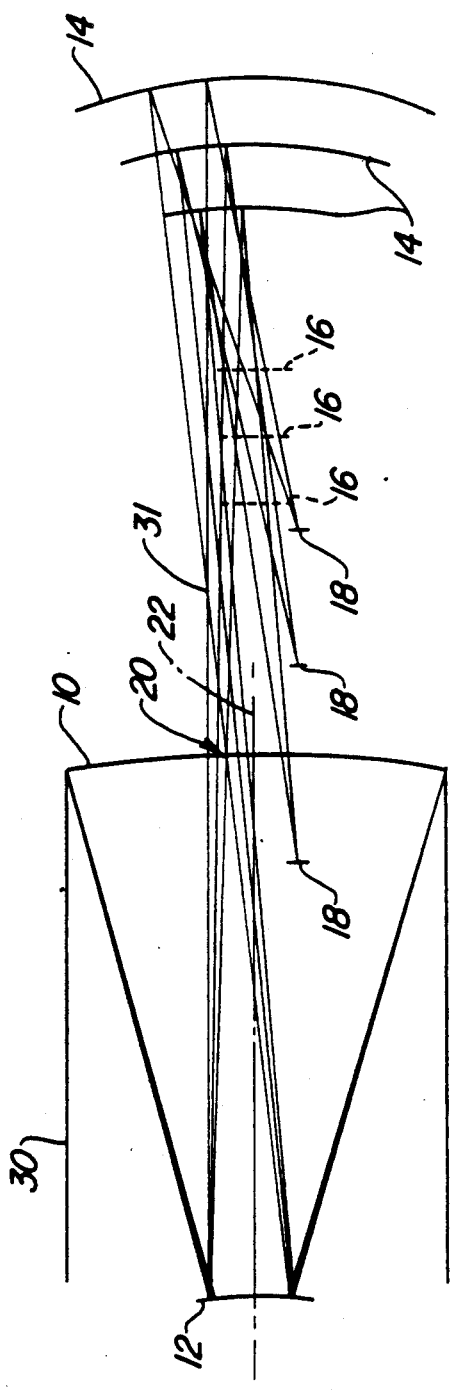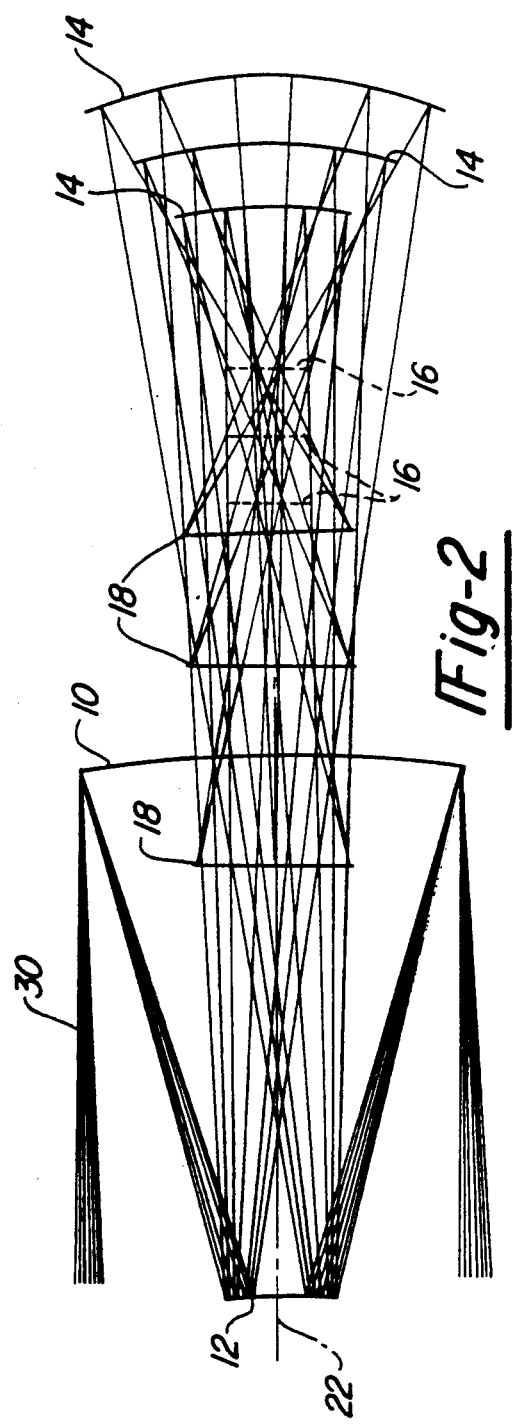

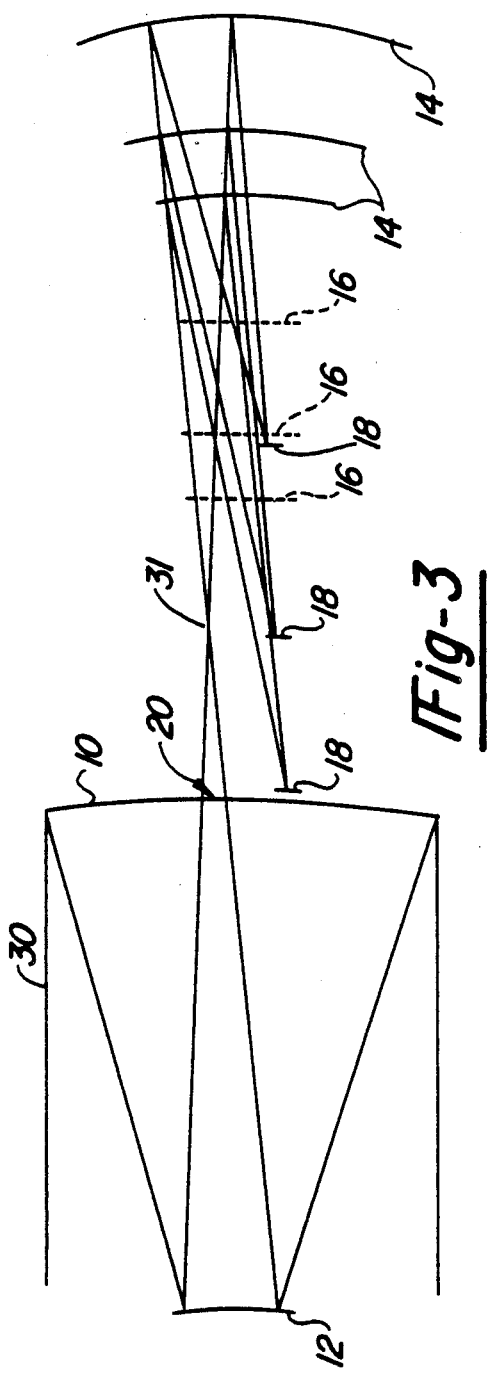
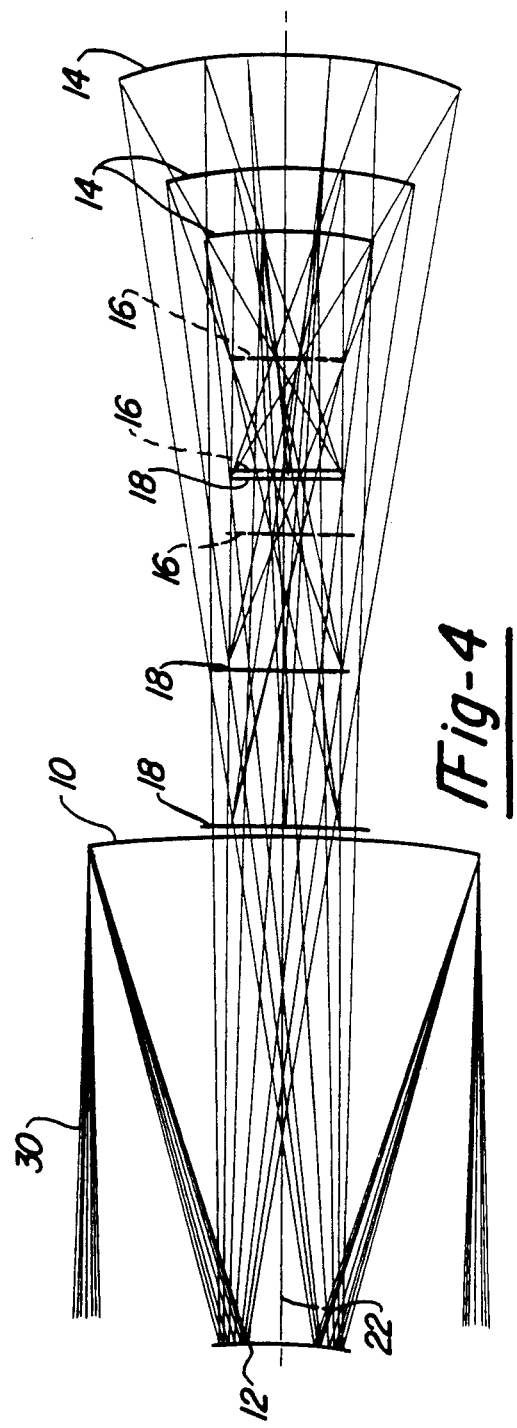

CONTINUOUS ZOOM ALL-REFLECTIVE OPTICAL SYSTEM

BACKGROUND

1. Technical Field

This invention relates to reflective telescope systems and, more particularly, to an all-reflective continuous zoom optical system.

2. Discussion

The performance of conventional high quality telescopes when used on the earth for celestial viewing is principally limited to the earth's atmosphere rather than by the construction of the telescopes. Atmospheric effects not only limit the resolution of a telescope, but also absorb large portions of the electromagnetic spectral range. While in the past, little could be done about this limitation, today, with the help of earth satellites and other space vehicles, it is possible to place a telescope above the atmosphere and perform extraterrestrial observations without interference from it. As a result, there has arisen a need for a telescope which can more fully take advantage of this new environment. Also, it should be understood that the present invention may be utilized for other airborne or ground based applications that require viewing distant objects.

One such telescope is that disclosed in U.S. Pat. No. 4,101,195, issued to Korsch. This reference discloses an anastigmatic three-mirror telescope. This telescope has a primary and secondary configuration similar to a Cassegrain design which forms a real image closely behind the primary mirror. The image is then relayed or reimaged by a tertiary mirror at approximately unit magnification to a flat plane for viewing, the plane being parallel to or displaced from the axis of the primary and secondary mirrors.

Also, the advantages of zoom optical systems are well known to those skilled in the art. However, virtually all of the known zoom optical systems utilize refractive optical elements in whole or in part. Refractive optical elements generally have one or more of the following disadvantages. Refractive systems generally have spectral limitations and chromatic aberrations. Refractive systems have size limitations and a lack of radiation hardness. Further, the refractive systems are sensitive to thermal changes and are exceptionally heavy.

SUMMARY OF THE INVENTION

According to the teachings of the present invention, a system is provided which retains the versatility and benefits of zoom optics while eliminating the disadvantages of refractive optical systems. The present invention provides an all-reflective continuous zoom system comprised of a three-mirror anastigmat, one of the mirrors which is moved to effect a change in focal length, field of view, or both. The faster speed, coarser resolution, wider field of view extreme of the zoom range enables search and acquisition functions during operation of the system. The slower speed, finer resolution and smaller field of view enables tracking and detailed imaging during operation of the system.

In the preferred embodiment, the reflective continuous zoom optical system is comprised of the following. A primary mirror having an opening central about a central axis. A secondary mirror facing the primary mirror. The secondary mirror is of a smaller diameter than the primary mirror and is positioned substantially symmetrically with the central axis of the primary mirror such that light from a viewed object passes around and by the secondary mirror and is reflected through the central opening in the primary mirror. Further, the system includes a mechanism for reflecting an image of the object being viewed to a plane for viewing. The reflecting mechanism is positioned to receive the light from the secondary mirror and is movable through a plurality of positions to effect focal length, field of view, or both of the system.

BRIEF DESCRIPTION OF THE DRAWINGS

The various advantages of the present invention will become apparent to those skilled in the art after a study of the following specification and by reference to the drawings in which:

FIG. 1 is a schematic diagram of an along-scan view of an apparatus in accordance with the teaching of the present invention;

FIG. 2 is a schematic diagram of a cross-scan view of FIG. 1;

FIG. 3 is a schematic diagram of an along-scan view of another apparatus in accordance with the teaching of the present invention;

FIG. 4 is a schematic diagram of a cross-scan view of FIG. 3; and

DESCRIPTION OF THE PREFERRED EMBODIMENT

Figure 5:
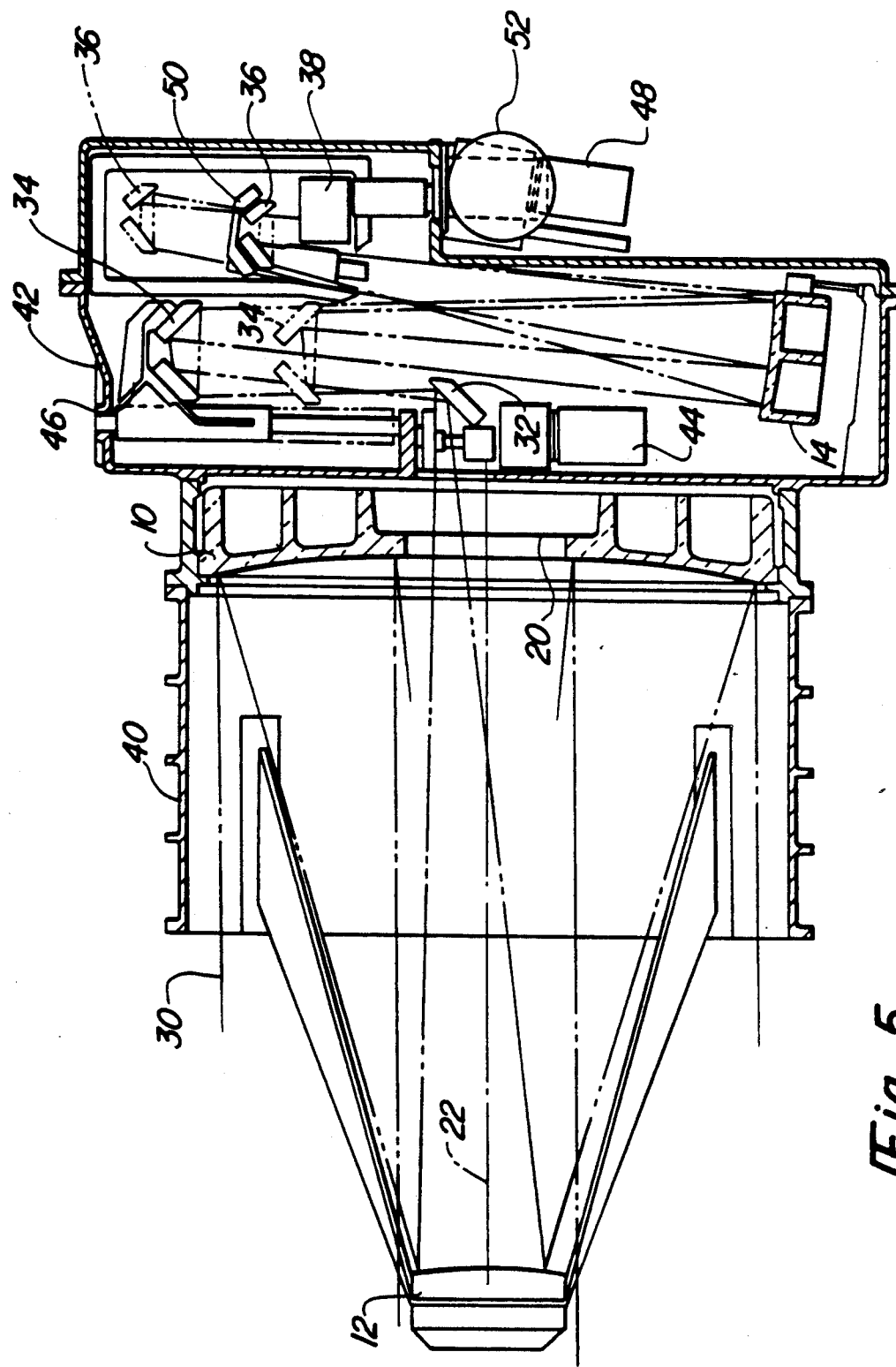
FIG. 5 is a vertical cross-section view of an opto-mechanical schematic illustrating implementations of a system in accordance with the present invention.

Referring to FIGS. 1 and 2, an anastigmatic optical system is shown including a primary 10, secondary 12 and tertiary 14 mirror. The system also includes an aperture stop 16 and a focal plane 18.

The primary mirror 10 includes a central opening 20 and a central axis 22 defining the system optical axis. The primary mirror 10 is a positive power mirror and may be an ellipsoidal conic or higher order aspheric mirror.

The secondary mirror 12 is a negative power mirror and is positioned substantially symmetric with the central axis 22 of the primary mirror 10. The secondary mirror 12 has a diameter smaller than the primary mirror 10 and may be a hyperboloid conic or higher order aspheric mirror.

The tertiary mirror 14 is a positive power mirror. The tertiary mirror 14 may be of ellipsoid conic shape or a higher order aspheric. There may be a single tertiary mirror 14 or a plurality of tertiary mirrors as described in applicant's related application entitled "Multi-Focal Length, Multi-Field of View Three-Way Mirror Anastigmat", U.S. patent application Ser. No. 259,012, filed the same day as the present application by the same inventor and assigned to the assignee of the present application, the specification of which is herein incorporated by reference.

The tertiary mirror 14 is ordinarily associated with at least one pair of planar fold mirrors, best seen in FIG. 5. The fold mirrors are generally the moving mirrors and move with respect to the tertiary mirror 14 reflecting the light beams 30 to or from the tertiary mirror 14. As the fold mirrors move, the focal length, field of view, or both is changed in the system.

In operation, an object to be viewed is reflected by the primary mirror 10. The light beams 30 from the object being viewed are received and reflected from the primary mirror 10 to the secondary mirror 12. The light beams 30 are received by and reflected from the secondary mirror 12 through the central opening 20 of the primary mirror 10. Prior or subsequent to the beams 30 passing through the central opening 20, an intermediate image of the object being viewed is formed by the primary-secondary mirrors at 31. The intermediate image, formed by beams 30, is reflected through the remainder of the system and is ultimately reimaged as the real image at the focal plane 18.

After passing through the central opening 20, the beams 30 generally are reflected by a stationary planar mirror 32 to a first pair of moveable planar fold mirrors 34. The first pair of moveable planar fold mirrors 34 move toward and away from the tertiary mirror 14, as seen in phantom in FIG. 5. The beams 30 are received and reflected from the first pair of moveable planar fold mirrors 34 to the tertiary mirror 14. The tertiary mirror 14 receives and reflects the rays 30 to a second pair of moveable planar fold mirrors 36. The second pair of moveable planar fold mirrors 36 move toward and away from the tertiary mirror 14. The second pair of moveable planar fold mirrors 36 receives and reflects the beams 30 through the aperture stop 16 to an electronic sensing device 38 at the focal plane 18. The electronic sensing device may be a detector array or the like.

The moveable planar fold mirrors 34 and 36 and the tertiary mirror 14 effect the focal length, field of view, or both of the image viewed through the primary 10 and secondary 12 mirrors. Thus, the system provides a zoom range which is appropriate for search and acquisition functions as well as for tracking and detail imaging functions. In the system, the distance from the tertiary mirror 14 to the aperture stop 16 is substantially constant as the zoom moves through its plurality of position. Also, as a practical matter, it is preferred that the powered mirrors, aperture stop, and focal plane remain fixed.

In FIGS. 1 and 2, the final images at focal plane 18 have a common offset from the optical axis. However, due to varying magnification ratios of the tertiary mirror 14, the corresponding intermediate images 31 have varying offsets from the optical axis. As a consequence, there is a line of sight shift with the zoom operation. However, this line of sight shift does not adversely effect the system.

In FIGS. 3 and 4, the inverse of FIGS. 1 and 2 is illustrated. The final images on the focal plane 18 have varying offsets. The offsets correspond to the tertiary mirror's 14 varying magnification ratios to yield intermediate images 31 with a constant or common offset. Thus, there is no line of sight shift with the zoom operation. It should be noted that either of the above offsets work equally as well as the other.

As best seen in FIG. 5, the system generally includes a housing or tube 40 which houses the primary 10 and secondary 12 mirrors. A second portion of the housing 42 is coupled with the tube 40. A drive gear box 44 is coupled with the first pair of moveable planar fold mirrors 34 through a carriage 46 to drive the first pair of moveable planar fold mirrors 34. A second drive gear box 48 is coupled with the second pair of moveable planar fold mirrors 36 through a carriage 50 to drive the second pair of moveable planar fold mirrors 36. Also, a refrigerator may be coupled with the housings to cool the electronic sensing device as might be required for imaging in the infrared portion of the electromagnetic spectrum. It should be understood that the tertiary mirror could be moved fore and aft to eliminate the need for the moveable fold mirrors.

A specific prescription for the system in accordance with the present invention is as follows.

TABLE 1

OPTICAL PRESCRIPTION OF A SPECIFIC EMBODIMENT OF OPTICAL SYSTEM OF THE PRESENT INVENTION

| # | Description | Radius | Conic Constant | Thickness | |
|---|---|---|---|---|---|
| 10 | Primary Mirror | −104.067 | −0.92298 | −39.4831 | |
| 12 | Secondary Mirror | −32.8640 | −1.9639 | 100.005 | Ⓐ |
| | | | | 91.329 | Ⓑ |
| | | | | 86.351 | Ⓒ |
| 14 | Tertiary Mirror | −38.6032 | 1.0489* | −32.847 | Ⓐ |
| | | | | −39.065 | Ⓑ |
| | | | | −46.062 | Ⓒ |
| 18 | Focal Plane | ∞ | — | — | |

[(+) Thickness are to the right; (+) Radii have centers to the right]
*Higher order aspheric figure departures according to the equation:

$$z = \frac{c\rho^2}{1 + \sqrt{1 - (k+1)c^2\rho^2}} + d\rho^4 + e\rho^6$$

where:
z = surface sag
c = 1/radius
k = cc = conic constant = −(eccentricity)$^2$
$\rho^2 = x^2 + y^2$
$d = 0.32497 \times 10^{-5}$
$e = 0.36639 \times 10^{-8}$ zoom configuration Ⓐ: 30 diameter entrance aperture 154.2 effective focal length F/5.14 optical speed 3° line field of view Ⓑ: 30 diameter entrance aperture 225.0 effective focal length F/7.50 optical speed 2.25° line field of view Ⓒ: 30 diameter entrance aperture 305.5 effective focal length F/10.2 optical speed 1.5° line field of view While the above describes a preferred embodiment of the present invention, it will be understood that the prescription may be modified or changed without deviating from the scope of the invention.

The present invention has several advantages over conventional zoom type lenses. The present invention uses an all-reflective system to provide a zoom optical system. The present invention enables fast optical speed, coarse resolution and wide field of view extreme of the zoom range which is appropriate for search and acquisition functions. The present invention also provides slower optical speed, finer resolution and smaller field of view extreme which provides tracking and detailed imaging functions. The present invention enables the use of a Cassegrain foreoptic system with a tertiary mirror operating over a continuous range of conjugates to yield high resolution imagery on a flat focal surface.

It should be understood that while this invention has been described in connection with a particular example hereof, that various modifications, alterations and variation of the disclosed preferred embodiment can be made after having the benefit of a study of the specification, drawings and the subjoined claims.

What is claimed is:

1. A reflective continuous zoom optical system comprising:
   a fixed position primary mirror having an opening central about a central axis;
   a fixed position secondary mirror facing said primary mirror, said secondary mirror being of a smaller diameter than said primary mirror and positioned substantially symmetrically with said central axis of said primary mirror such that light from a viewed object passes around and by said secondary mirror and is reflected through said central opening in said primary mirror; and means for reflecting said image of the object being viewed to a fixed position plane for viewing, said reflecting means positioned to receive light from said secondary mirror and movable through a plurality of positions altering focal length of the system and said primary mirror, secondary mirror and viewing plane being fixed with respect to one another.

2. The system according to claim 1 wherein said primary mirror has positive power.

3. The system according to claim 1 wherein said secondary mirror has negative power.

4. The system according to claim 1 wherein said imaging means include one or more tertiary mirrors.

5. The system according to claim 4 wherein said one or more tertiary mirrors are positive power mirrors.

6. The system according to claim 4 wherein said imaging means includes one or more pairs of movable planar fold mirrors receiving and reflecting light to or from said tertiary mirror such that as said one or more pairs of planar fold mirrors move, said focal length of said system changes.

7. The system according to claim 1 further comprising an electronic sensing means positioned adjacent to said viewing plane for receiving light from said image means.

8. A reflective continuous zoom optical system comprising:
a fixed position primary mirror having an opening central about a central axis;
a fixed position secondary mirror facing said primary mirror, said secondary mirror being of a smaller diameter than said primary mirror and positioned substantially systematically with said central axis of said primary mirror such that light from a viewed object passes around and by said secondary mirror and is reflected through said central opening in said primary mirror; and
means for reflecting said image of the object being viewed to a fixed position plane for viewing, said reflecting means positioned to receive light from said secondary mirror and movable through a plurality of positions altering field of view of the system and said primary mirror, secondary mirror and viewing plane being fixed with respect to one another.

9. The system according to claim 8 wherein said primary mirror has positive power.

10. The system according to claim 8 wherein said secondary mirror has negative power.

11. The system according to claim 8 wherein said image means includes one or more tertiary mirrors.

12. The system according to claim 11 wherein said one or more tertiary mirrors are positive power mirrors.

13. The system according to claim 11 wherein said imaging means includes one or more pairs of movable planar fold mirrors receiving and reflecting light to or from said tertiary mirror such that as said one or more pairs of planar fold mirrors move, said field of view of said system changes.

14. The system according to claim 8 further comprising an electronic sensing means positioned adjacent to said viewing plane for receiving light from said imaging means.

15. A reflective continuous zoom optical system comprising:
a fixed position primary positive power mirror having an opening central about a central axis;
a fixed position secondary negative power mirror facing said primary mirror, said secondary mirror being of a smaller diameter than said primary mirror and positioned substantially symmetrically with said central axis of said primary mirror such that light from a viewed object passes around and by said secondary mirror and is reflected through said central opening in said primary mirror and an intermediate image of the viewed object being formed by said primary and secondary mirrors; and
means for reflecting said image of the object being viewed to a fixed position plane for viewing, said reflecting means positioned to receive light from said secondary mirror and movable through a plurality of positions altering focal length and field of view of the system and said primary mirror, secondary mirror and viewing plane being fixed with respect to one another.

16. The system according to claim 15 wherein said imaging means includes one or more tertiary mirrors.

17. The system according to claim 16 wherein said one or more tertiary mirrors are positive power mirrors.

18. The system according to claim 16 wherein said imaging means includes one or more pairs of movable planar fold mirrors receiving and reflecting light to or from said tertiary mirror such that as said one or more pair of planar fold mirrors move, said focal length and field of view of said system changes.

19. The system according to claim 15 further comprising an electronic sensing means positioned adjacent to said viewing plane for receiving light from said imaging means.

* * * * *

UNITED STATES PATENT AND TRADEMARK OFFICE
CERTIFICATE OF CORRECTION

PATENT NO. : 4,993,818

DATED : February 19, 1991

INVENTOR(S) : LACY G. COOK

It is certified that error appears in the above-identified patent and that said Letters Patent is hereby corrected as shown below:

Column 5, line 39, delete "systematically" and substitute therefor --symmetrically--.

Column 6, line 47, delete "pair" and substitute therefor --pairs--.

Signed and Sealed this

Fifth Day of January, 1993

Attest:

DOUGLAS B. COMER

Attesting Officer

Acting Commissioner of Patents and Trademarks